(12) United States Patent
Sakata et al.

(10) Patent No.: US 7,150,828 B2
(45) Date of Patent: Dec. 19, 2006

(54) FLUID FILTER HAVING DRAIN STRUCTURE AND DRAIN TOOL

(75) Inventors: Haruaki Sakata, Kariya (JP);
Toshihiro Takahara, Kariya (JP);
Yoshihiko Sugiura, Kariya (JP);
Noriyuki Tsuge, Okazaki (JP)

(73) Assignees: Toyota Boshoku Corporation (JP);
Denso Corporation (JP)

( * ) Notice: Subject to any disclaimer, the term of this patent is extended or adjusted under 35 U.S.C. 154(b) by 132 days.

(21) Appl. No.: 10/954,352

(22) Filed: Oct. 1, 2004

(65) Prior Publication Data

US 2005/0072719 A1    Apr. 7, 2005

(30) Foreign Application Priority Data

Oct. 1, 2003    (JP) .............................. 2003-343639

(51) Int. Cl.
| | |
|---|---|
| B01D 35/16 | (2006.01) |
| B01D 27/08 | (2006.01) |
| F16N 31/00 | (2006.01) |
| F01M 11/04 | (2006.01) |
| F16L 37/40 | (2006.01) |

(52) U.S. Cl. ...................... 210/234; 210/248; 210/440; 251/149.6; 251/149.1; 251/149.9; 184/1.5
(58) Field of Classification Search ................ 210/234, 210/248, 440; 251/149.6, 149.9, 149.1; 184/1.5
See application file for complete search history.

(56) References Cited

U.S. PATENT DOCUMENTS

| | | | | |
|---|---|---|---|---|
| 3,387,621 | A | * | 6/1968 | Schaff .......................... 137/322 |
| 3,507,299 | A | * | 4/1970 | Murdock ..................... 137/322 |
| 4,386,639 | A | * | 6/1983 | Gable et al. ................. 141/351 |
| 4,565,629 | A | | 1/1986 | Wilson et al. |
| 4,951,723 | A | * | 8/1990 | Hoeptner, III ............... 141/351 |
| 5,048,578 | A | * | 9/1991 | Dorf et al. ................... 141/346 |
| 5,366,400 | A | | 11/1994 | Kucik |
| 6,258,269 | B1 | | 7/2001 | Knight |
| 2002/0104980 | A1 | | 8/2002 | Jainek |

FOREIGN PATENT DOCUMENTS

| | | |
|---|---|---|
| DE | 19960203 A1 | 6/2001 |
| EP | 1419808 A1 | 5/2004 |
| JP | A-11-104408 | 4/1999 |
| JP | A-2000-42309 | 2/2000 |

OTHER PUBLICATIONS

European Examination Report.
Patent Abstracts of Japan, vol. 1997, No. 11, Nov. 28, 1997, & JP 9 173716 A (Denso Corporation) Jul. 8, 1997.
Chinese Examination Report/Office Action—Dec. 2005.

* cited by examiner

*Primary Examiner*—Thomas M. Lithgow
(74) *Attorney, Agent, or Firm*—Nixon & Vanderhye PC

(57) ABSTRACT

A drain structure for a fluid filter includes a cap internally forming a drain hole. The cap receives a valve member urged by an urging means in a direction, in which the valve member blocks the drain hole. Normally, the drain hole is blocked with a drain member. When fluid is drained from the drain hole, the drain member is removed from the drain hole, and a drain tool is inserted into the drain hole, so that the drain tool displaces the valve member in a direction, in which the drain hole is unblocked. The drain tool has a hooking portion that can hook to a hooked portion provided to the cap by axially rotating the drain tool inserted into the drain hole of the cap. Thus, the drain tool can be connected with the cap while the hooking portion is supported by the hooked portion.

15 Claims, 5 Drawing Sheets

FLUID FILTER HAVING DRAIN STRUCTURE AND DRAIN TOOL

CROSS REFERENCE TO RELATED APPLICATIONS

This application is based on and incorporates herein by reference Japanese Patent Application No. 2003-343639 filed on Oct. 1, 2003.

FIELD OF THE INVENTION

The present invention relates to a drain structure and a drain tool for a fluid filter, and a method for draining the fluid filter. Specifically, fluid can be restricted from dripping to a worker, and fluid can be restricted from splashing in an engine room when fluid is drained for replacing a filter element of a fluid filter. Besides, dust or the like can be restricted from intruding into the fluid filter from the outside of the fluid filter so that reliability of blockade of the drain hole can be maintained for a long period.

BACKGROUND OF THE INVENTION

According to JP-A-2000-42309, an element replaceable type fluid filter is disclosed. A drain member (drain plug 15) is screwed into a drain hole formed in a cap (lower case 12). The drain member 15 is loosened and removed from the drain hole so that the drain hole is opened and remaining oil is drained before an upper case 11 and the lower case 12 are detached from each other for replacing a filter element 13. Thus, oil remaining in the housing can be drained from the drain hole.

When the filter element 13 is replaced, an engine may be warmed up and oil may be heated in the fluid filter. In this situation, remaining oil is drained simultaneously with unblocking the seal member (packing) 15a of the drain member 15. As a result, heated remaining oil may flow out of the drain hole, and the oil may drip to hands of a worker when the drain member 15 is removed. Besides, the oil may splash in an engine room, and the engine room needs to be cleaned.

According to JP-A-11-104408, a cylindrical drainpipe member (drain plug 15) having a drain passage (central hole 15g, window hole 15f) is screwed into the drain hole formed in a cap (lower case 12) in a replaceable type fluid filter.

When the fluid filter is used for filtering fluid, the drain passage of the drainpipe member and the inside of the housing are blocked with each other by a pair of a seal member (packing 15g) provided on the outer circumferential periphery of the drainpipe member. When the filter element 13 is replaced, the drainpipe member is loosened, so that the upper seal member is unblocked, and the drain passage and the inside of the housing are communicated with each other. Oil remaining in the housing is drained through the drain passage of the drainpipe member, so that drained oil can be restricted from dripping to hands of a worker.

When the drainpipe member is loosened and the upper seal member is unblocked, blockade of the lower seal member is maintained, so that remaining oil does not leak from a portion excluding the drain passage of the drainpipe member when remaining oil is drained.

However, in this fluid filter, the drainpipe member is hollow to internally form the drain passage. Therefore, dust may intrude into the inside of the housing from the outside through the drain passage of the hollow drainpipe member when the fluid filter is used for filtering fluid. Accordingly, it is difficult to maintain blockade of the seal member of the drain hole.

SUMMARY OF THE INVENTION

In view of the foregoing problems, it is an object of the present invention to produce a drain structure of a fluid filter, in which heated oil can be restricted from dripping to a worker when fluid is drained to replace a component such as a filter element. Furthermore, oil can be restricted from splashing, and foreign material can be restricted from intruding into the drain hole from the outside to maintain high reliability of blockade of the drain hole for a long period when the drain hole is blocked. It is another object of the present invention to produce a fluid filter having the drain structure, a drain tool for the drain structure and a method for draining the fluid filter.

According to the drain tool and the fluid filter in the present invention, the fluid filter includes a housing that is constructed with a case and a cap. The cap forms a drain hole that is connectable with a drain member, such that the drain member blocks the drain hole of the cap when the cap is connected with the drain member. The housing receives the valve member biased by a resilient means in a direction in which the valve member blocks the drain hole. The drain tool is connectable to the drain hole of the cap when the drain member is removed from the cap. The drain tool includes a hooking portion that detachably hooks to a hooked portion provided to the cap, when the drain tool is inserted into the drain hole of the cap to displace the valve member in a direction in which the drain hole is unblocked. The drain tool is rotated around the axis of the drain hole, so that the hooking portion and the hooked portion are connected with each other and disconnect from each other, when the drain tool is inserted into the drain hole and the drain hole is unblocked. The drain tool defines a drain passage that includes a central passage along an axial direction of the drain tool and a communication passage communicating with the central passage. The communication passage opens to the radially outer circumferential periphery of the drain tool.

The fluid filter is drained in the following manner. The drain member is detached from the drain hole of the cap. Here, the drain member is detachably attached to the drain hole from the outside of the cap to block the drain hole. The drain tool is inserted into the drain hole to displace the valve member in the housing against resiliency of the resilient means that biases the valve member in the direction in which the valve member blocks the drain hole, so that the drain tool unblocks the drain hole. The drain tool is rotated around the axis of the drain hole to hook the hooking portion of the drain tool to the hooked portion of the cap to maintain the drain hole unblocked. Fluid in the housing is drained to the outside through the drain passage defined in the drain tool.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

Here, an oil filter is shown as an example of an element replaceable type filter. The oil filter is provided to a cylinder block (not shown) of an internal combustion engine.

Figure 1:
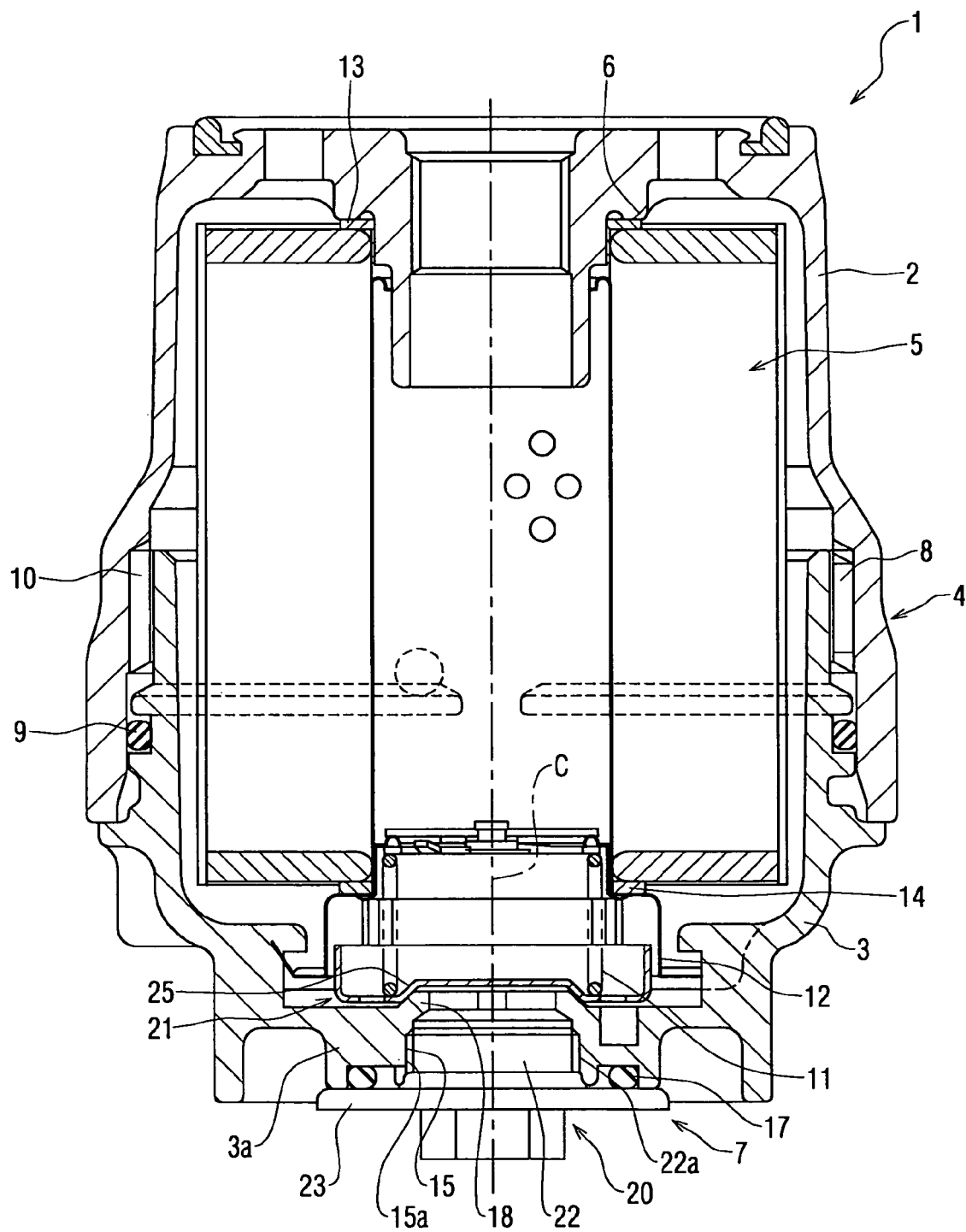
FIG. 1 is a cross-sectional side view showing a fluid filter in an embodiment of the present invention.

As shown in FIG. 1, an oil filter 1 is constructed with a housing 4, a filter element 5 received in the housing 4, a drain structure 7 and the like. The housing 4 is constructed with a metallic case 2 and a cap 3 which are attachable and detachable from each other.

The cap 3 has a male thread potion 8, which is formed on the radially outer circumferential periphery of the cap 3. An O-ring 9 is provided to the cap 3. The case 2 has a female thread potion 10, which is formed on the radially inner circumferential periphery of the case 2. The male thread potion 8 of the cap 3 is screwed into the female thread potion 10 of the case 2, so that the cap 3 is connected to the case 2 via the O-ring 9. Thus, the inside of the housing 4 is maintained liquid tightly at the connecting portion 37 between the cap 3 and the case 2. The upper end portion of the filter element 5 is blocked with a case protrusion 6 formed in the case 2 via a seal member 13, and the lower end portion of the filter element 5 is blocked with a plate (element support) 12 via a seal member 14, by resiliency of a spring 11 in the housing 4. Oil passes through the filter element 5, so that the oil is filtered in the filter element 5.

Figure 3:
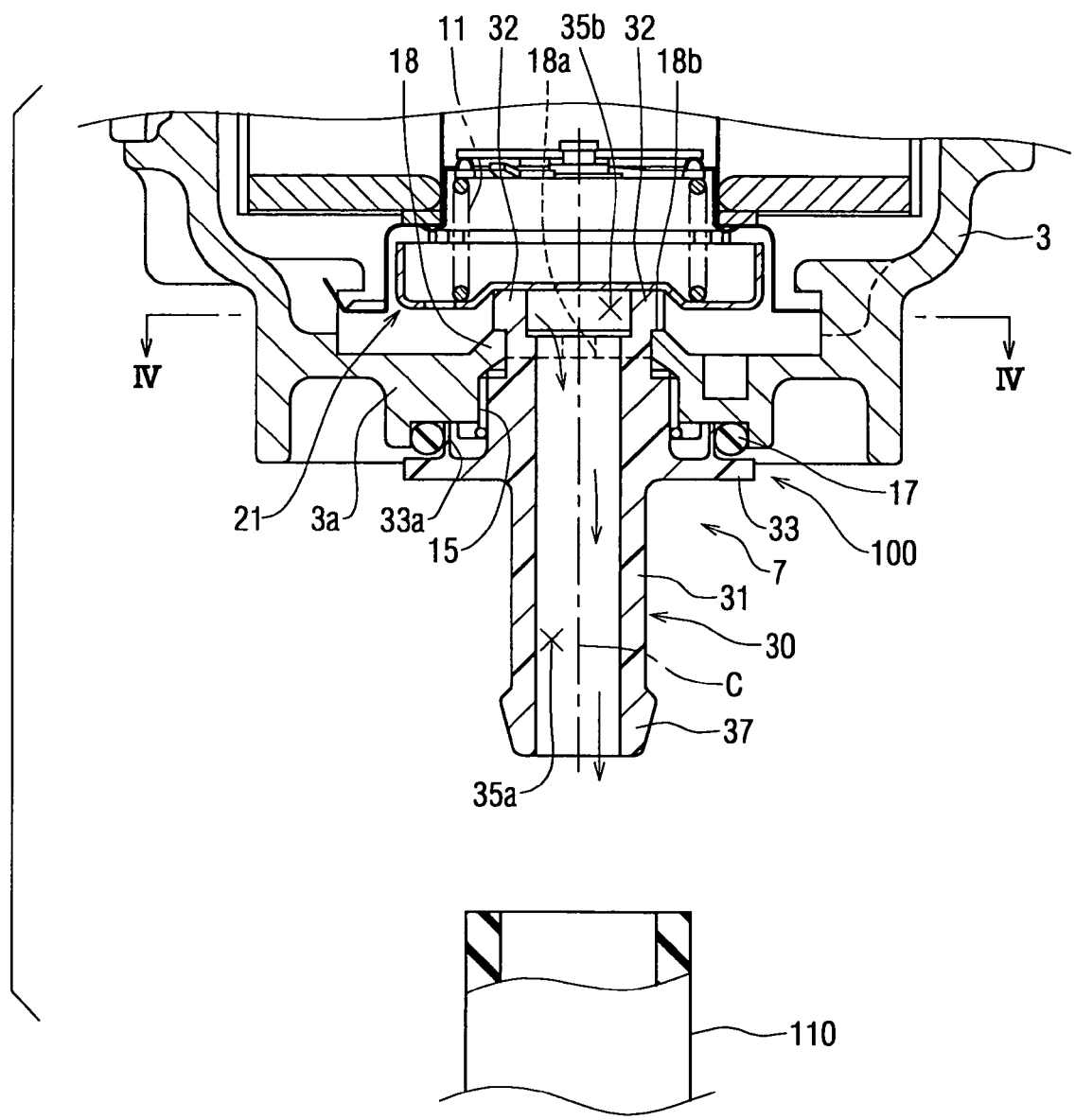
FIG. 3 is a cross-sectional side view showing the drain structure to which a drain tool is inserted.
Figure 5:
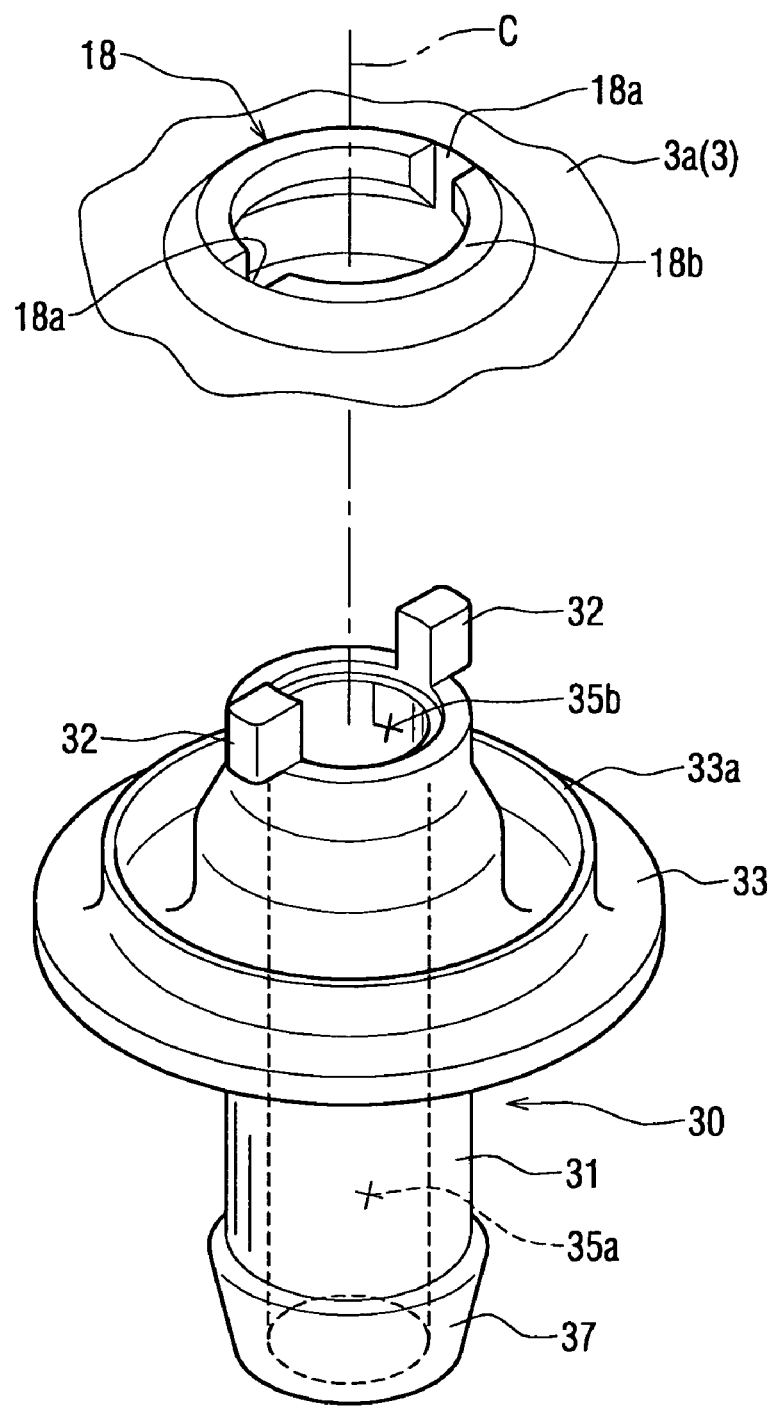
FIG. 5 is a perspective view showing the drain tool and a cap protrusion.

The cap 3 has a drain hole 15 in the substantially center of a bottom portion 3a of the cap 3. The drain hole 15 has a female thread 15a in the inner circumferential periphery of the drain hole 15. An O-ring 17 (seal member) is provided to the lower end portion of the bottom portion 3a of the cap 3. An inclined annular cap protrusion 18 (hooked portion) is formed on the upper end portion of the bottom portion 3a of the cap 3. As shown in FIGS. 3 and 5, a pair of guide grooves 18a is formed in the radially inner circumferential periphery of the cap protrusion 18 along the axial direction of the drain hole 15. The upper end face of the cap protrusion 18 is a restriction face 18b that restricts movement of hooking portions 32 of a drain tool 30 in an axial direction C.

Figure 2:
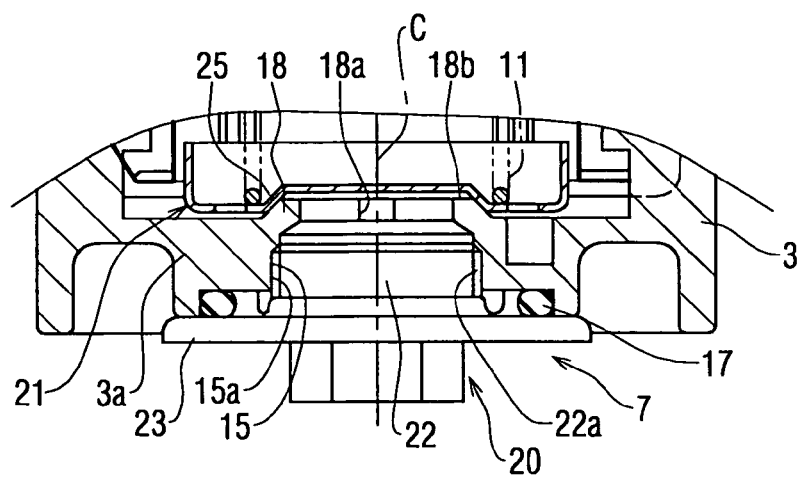
FIG. 2 is a cross-sectional side view showing a drain structure to which a drain bolt.

Next, a drain structure 7 is described. As shown in FIGS. 1, 2, the drain structure 7 is mainly constructed with a metallic drain bolt (drain member) 20, a metallic valve member 21, and a spring (resilient means) 11. The drain bolt 20 has a plug portion 22 having a male thread 22a on its radially outer circumferential periphery and a flange portion 23 connected to the lower portion of the plug portion 22. The male thread 22a of the drain bolt 20 and the female thread 15a of the drain hole 15 are screwed with each other, so that the drain bolt 20 is screwed into the drain hole 15. Thus, the flange portion 23 of the drain bolt 20 contacts with the O-ring 17 and presses the O-ring 17, so that the drain hole 15 is blocked.

The valve member 21 is formed in a saucer-shape, and has a taper-shaped contact portion 25 that contacts with the outer circumferential periphery of the cap protrusion 18. The spring 11 urges the valve member 21, so that the contact portion 25 of the valve member 21 normally contacts with the cap protrusion 18 of the cap 3, and the drain hole 15 is blocked, i.e., metal-sealed. Therefore, even when the drain bolt 20 is removed from the drain hole 15 of the cap 3, oil remaining in the housing 4 does not easily flow out of the drain hole 15.

Next, detail of a drain tool 30 is described. As shown in FIGS. 3 and 5, the drain tool 30 is formed of synthetic resin to be in a cylindrical shape. The drain tool 30 has a pipe portion 31, a pair of hooking portions 32 and a flange portion 33. The pipe portion 31 has openings on its both end sides. The hooking portions 32 axially and radially protrude from an upper end portion of the pipe portion 31. The flange portion 33 is saucer-shaped, and is provided to an intermediate portion of the pipe portion 31. The flange portion 33 has an annular rib 33a on the upper face of the flange portion 33.

The drain tool 30 has a drain passage 35. The drain passage 35 includes a central hole (central passage) 35a and a space (communication passage) 35b. The central hole 35a is formed along the axial direction of the pipe portion 31, and the central hole 35a has openings on its both axial ends. The space 35b is formed with a pair of the hooking portions 32. Specifically, the space 35b is formed radially internally between the hooking portions 32. The hooking portions 32 has a shape such that the hooking portions 32 is guided by guide grooves 18a formed in the cap protrusion 18, when the drain tool 30 is inserted into the drain hole 15. When the hooking portion 32 is free from the guide groove 18a, i.e., when the hooking portion 32 is not circumferentially restricted by the guide groove 18a, the drain tool 30 is rotated around the axial direction C. The hooking portion 32 of the drain tool 30 hooks to the restriction face 18b of the cap protrusion 18 of the cap 3, so that the drain tool 30 is fixed to the cap 3. When the drain tool 30 is fixed to the cap 3, the rib 33a of the flange portion 33 of the drain tool 30 radially compresses the O-ring 17 provided to the bottom face of the cap 3.

Next, an operation of the oil filter is described. As shown in FIG. 2, when the oil filter 1 is used in a normal condition, that is, when the filter element 5 is not replaced, the drain bolt 20 is attached to the drain hole 15 of the cap 3 via the O-ring 17, so that the drain hole 15 is sealed and blocked.

When the filter element 5, the O-rings 9, 17 and the like are replaced, a worker loosens the drain bolt 20, and pulls the drain bolt 20 out of the drain hole 15. In this situation, the contact portion 25 of the valve member 21 contacts with the cap protrusion 18 to block, i.e., metallically seal the contact portion 25 by resilience of the spring 11, so that oil remaining in the housing 4 is restricted from flowing out of the drain hole 15.

Figure 4:
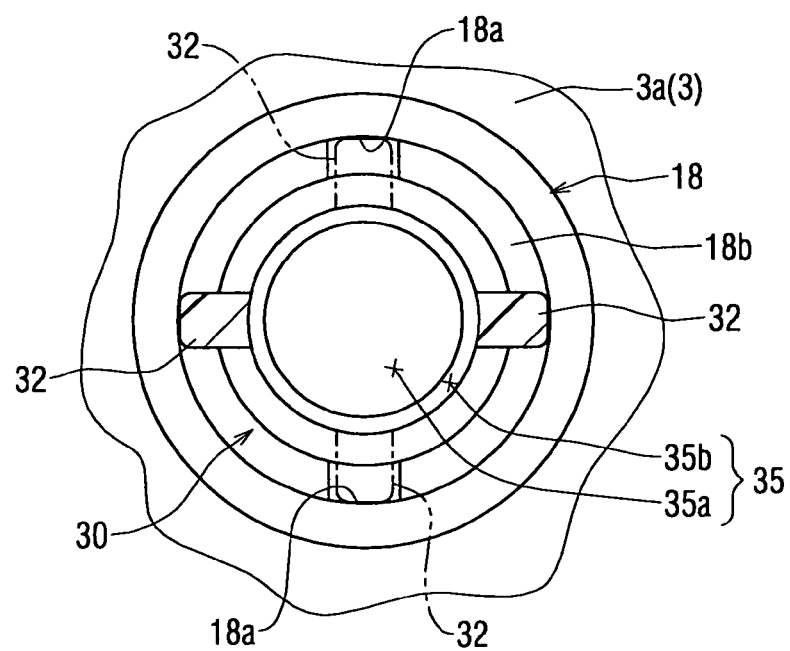
FIG. 4 is a partially cross-sectional top view taken along the line IV—IV in FIG. 3.

As shown by dotted line in FIG. 4, subsequently, the worker inserts the drain tool 30 into the drain hole 15, and axially guides the hooking portion 32 of the drain tool 30 along the guide groove 18a of the cap protrusion 18. The hooking portion 32 axially passes through the guide groove 18a, and axially moves across the restriction face 18b of the cap protrusion 18. The hooking portion 32 is released from guide of the guide groove 18 in the circumferential direction thereof. The hooking portion 32 axially raises the valve member 21 to the upper side against resilience of the spring 11, so that the drain hole 15 blocked with the valve member 21 is unblocked. Subsequently, from this situation, the drain tool 30 is rotated around the axial direction C of the drain hole 15 by about 90°, so that the hooking portion 32 of the drain tool 30 moves up to the restriction face 18b of the cap protrusion 18 as shown by solid line in FIG. 4. Thus, the hooking portion 32 hooks onto the restriction face 18b, and the drain tool 30 is connected and fixed to the cap 3. Thus, blockade of the drain hole 15 by the valve member 21 is unblocked, is maintained, so that oil remaining in the housing 4 is drained to the outside through the space 35b and the central hole 35a of the drain tool 30. In this situation, the drain tool 30 is fixed to the cap 3, and the rib 33a of the flange portion 33 of the drain tool 30 contacts with the O-ring 17 provided to the cap 3, so that the rib 33a of the flange portion 33 radially compresses the O-ring 17.

Figure 6:
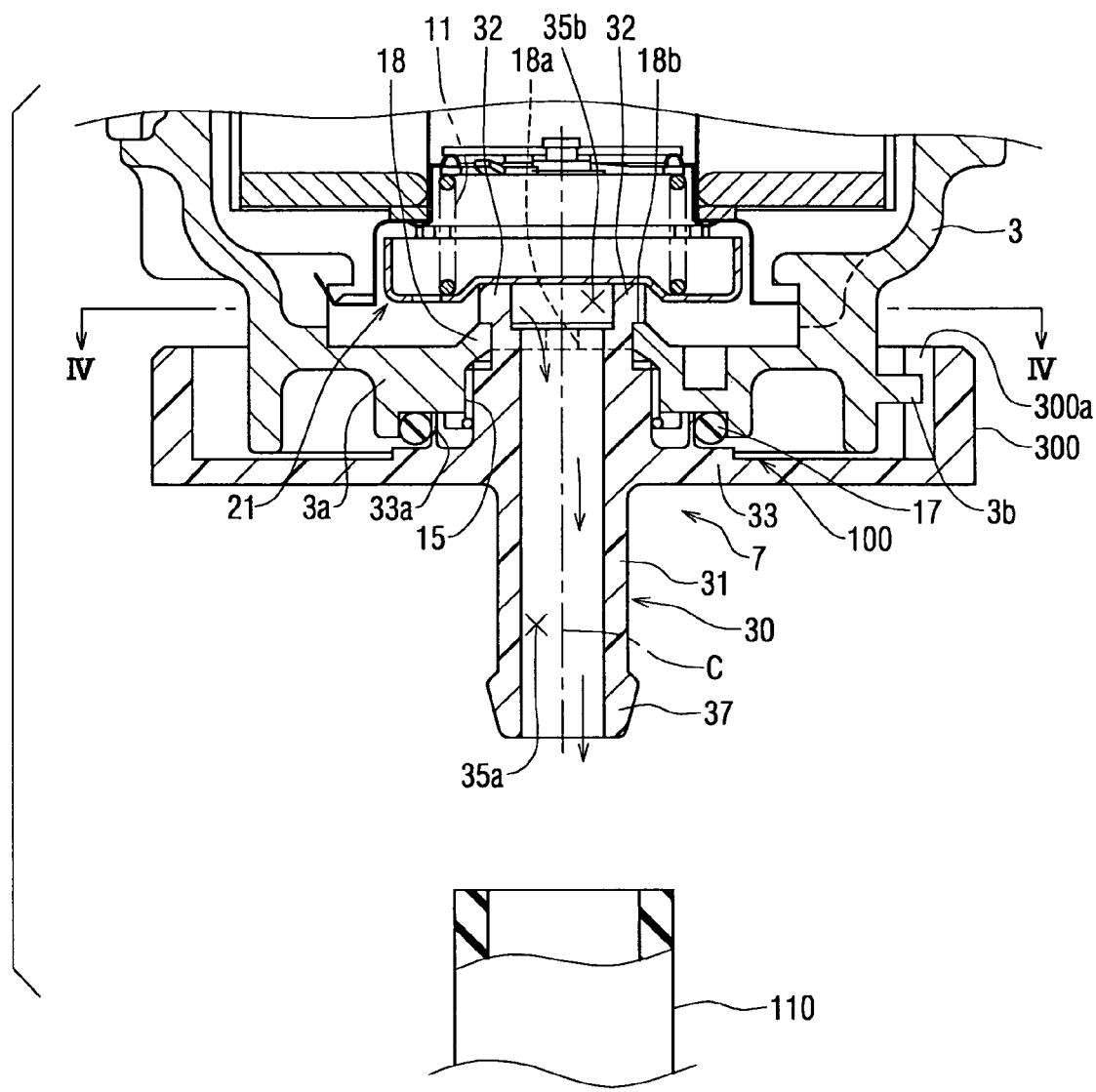
FIG. 6 is a cross-sectional side view showing the drain structure to which the drain tool and a detaching tool is attached.

Subsequently, when the oil remaining in the housing 4 is substantially completely drained, the worker rotates the drain tool 30 around the axial direction C of the drain hole 15 by about 90°, so that the hooking part 32 of the drain tool 30 circumferentially coincides with the guide groove 18a of the cap protrusion 18. In this situation, the drain tool is pulled out of the cap 3. The cap 3 is loosened using a detach tool 300 as shown in FIG. 6, and the cap 3 is pulled out of the case 2. Here, the detach tool shown in FIG. 6 is an example that is integrally formed with the drain tool 30. After that, the filter element 5, the O-ring 17 and the like are replaced.

When the oil filter 1 is in a normal condition, e.g., the oil filter 1 filters oil, the drain bolt 20 is screwed into the drain hole 15, and the drain hole 15 is completely blocked with the drain bolt 20. Therefore, dust such as sand or clay does not intrude into the housing 4 from the outside through the drain hole 15, so that reliability of blockade of the drain hole 15 sealed with the O-ring 17 can be maintained for a long period. When the filter element 5 or the like is replaced, remaining oil is drained using the drain tool 30 before the case 2 and the cap 3 are separated, so that heated oil can be restricted from dripping to a worker when fluid is drained. Further, the drain tool 30 is inserted into the drain hole 15, and is rotated around the axial direction C of the drain hole 15, so that the hooking portion 32 moves up to the restriction face 18b of the cap protrusion 18, and the drain tool 30 can be fixed to the cap 3. Therefore, a worker need not to support the drain tool 30 for maintaining the drain tool 30 raised upwardly when remaining oil is drained, so that workability of draining can be enhanced.

Furthermore, the guide groove 18a and the restriction face 18b are provided to the cap protrusion 18. Here, the guide groove 18a guides axial movement of the hooking portion 32 of the drain tool 30 when the hooking portion 32 axially passes through the guide groove 18a. The restriction face 18b restricts axial movement of the hooking portion 32 of the drain tool 30 when the hooking portion 32 hooks to the restriction face 18b. Therefore, detaching operation of the drain tool 30 with respect to the drain hole 15 and attaching operation of the hooking portion 32 of the drain tool 30 to the restriction face 18b of the cap protrusion 18 can be steadily and easily performed.

Furthermore, the rib 33a of the flange portion 33 of the drain tool 30 radially compresses the O-ring 17 attached to the cap 3 to block the portion between the drain tool 30 and the cap 3, while the drain tool 30 is fixed to the cap 3. Therefore, fluid can be more steadily restricted from flowing out through a portion excluding the drain passage 35 of the drain tool 30 when oil is drained. That is, fluid can be restricted from flowing out of a connecting portion between the drain tool 30 and the cap 3, for example.

Furthermore, oil can be drained from the lower end opening of the drain tool 30 to an oil pan or the like located on the lower side of the drain tool 30, when remaining oil is drained. Here, as shown in FIG. 3, a connecting portion 37 having a radially externally protruded shape can be provided to the lower end portion of the drain tool 30 to be connected to one end of a hose 110 for draining oil through the hose 110, for example. Thus, oil can be restricted from dripping when the oil is drained. Therefore, workability can be restricted from being degraded due to splashing fluid when oil is drained.

Furthermore, the drain tool 30 is not limited for draining. As shown in FIG. 6, for example, the drain tool 30 can be integrally formed with a detaching tool 300 that is used for detaching the case 2 from the cap 3. Thus, draining oil and detaching the cap 3 from the case 2 can be a sequential work. That is, draining work can be performed using the detaching tool 300, and detaching the case 2 from the cap 3 can be sequentially performed after the draining work. Therefore, workability can be enhanced.

Furthermore, not to be limited to the metal seal structure, in which the contact portion 25 of the valve member 21 contacts with the cap protrusion 18, a seal member such as an O-ring can be provided to the valve member 21 or the cap protrusion 18 to seal therebetween.

Furthermore, a guide groove and a restriction face can be provided to the drain tool 30 as a hooking portion, and a cap protrusion protruding in the centripetal direction of the drain hole can be provided to the cap 3 as a hooked portion, for example. The hooking portion of the drain tool 30 and the hooked portion of the cap 3 can be constructed with threads that can be screwed with each other.

Furthermore, the number of the hooking portion 32 of the drain tool 30 and the number of the guide groove 18a of the cap 3 can be freely determined. A shape or the like of the hooking portion 32 and the guide groove 18a are not specifically limited, and can be freely determined.

The rotation angle of the drain tool 30 around the axial direction C of the drain hole 15 can be freely determined. Further, a restriction portion, which restricts a rotation range around the axial direction C of the drain tool 30, can be additionally provided.

The fluid filter including the drain structure and drain tool, and the method for draining fluid filter can be applied to an oil filter for filtering a foreign material, abrasive dust, carbon and the like included in lubricant oil for an engine, a fuel filter and the like.

Other Embodiment

A structure, a shape and a material or the like of the housing 4 can be freely determined, as long as the housing 4 is constructed with the cap 3 and the case 2, which can fit to each other. A connecting structure, i.e., detachable structure between the cap 3 and the case 2 can be formed with a bayonet structure or the like. The bayonet structure is constructed with a groove portion and a recess portion that can engage with each other, for example.

A structure, a shape, a material or the like of the cap 3 can be freely determined, as long as the cap 3 fits to the case 2 and the cap 3 has the drain hole 15. A location, a shape, a number of the drain hole 15 can be freely determined. In view of efficiency of draining, the drain hole 15 is preferably located in the central position of the bottom portion of the cap 3.

A structure, a shape, a material or the like of the hooked portion 18 can be freely determined. The hooked portion 18 can be provided to the inside of the cap 3 or the outside (face side) of the cap 3, for example. The hooked portion 18 can be integrally formed with the cap 3, or can be formed as a member separated from the cap 3.

The guide groove 18*a* and the restriction face 18*b* are connected such that the guide groove 18*a* and the restriction face 18*b* are perpendicular to each other. Perpendicularity between the guide groove 18*a* and the restriction face 18*b* can be displaced in angle as long as movement of the drain tool 30 is axially restricted.

A structure, a shape, a material or the like of the drain member 20 can be freely determined, as long as the drain member 20 is detachably attached to the cap 3 from the outside of the cap 3, and the drain member 20 can plug the drain hole 15.

The seal member 17 can be provided such that the seal member 17 is located between the bottom portion of the cap 3 and the flange portion 33 provided to the drain member 20 as a first structure as described above. Alternatively, the seal member 17 can be provided such that the seal member 17 is located between the inner circumferential periphery of the drain hole 15 and the outer circumferential periphery of the drain member 20, e.g., plug portion as a second structure, for example. One of the first structure and the second structure of the seal member 17 can be applied to the fluid filter 1. Alternatively, the first structure and the second structure of the seal member 17 can be combined to be applied to the fluid filter 1.

The seal structure 100 can be formed between the drain tool 30 inserted into the drain hole 15 and the cap 3 in following manners. The seal member (e.g., O-ring) 17 is located between the bottom portion of the cap 3 and the flange portion 33 of the drain tool 30 as a first structure as described above. The outer circumferential periphery of the drain tool 30 contacts with the inner circumferential periphery of the drain hole 15 as a second structure. The seal member 17 is provided between the inner circumferential periphery of the drain hole 15 and the outer circumferential periphery of the drain tool 30 as a third structure, for example. One or two of the first, second and third structure of the seal structure 100 can be applied to the fluid filter 1. Alternatively, the first, second and third structure of the seal structure 100 can be combined. Here, the seal member 17 provided between the drain member 20 and the drain tool 30 can be also provided between the drain member 20 and the cap 3, for example.

A structure, a shape, a material or the like of the valve member 21 can be freely determined, as long as the valve member 21 is provided in the cap 3, and the valve member 21 can block the drain hole 15. The valve member 21 can include a contact portion 25 that contacts with a valve seat portion (e.g., cap protrusion) 18 provided to the cap 3, for example. Thus, the contact portion 25 of the valve member 21 contacts with the valve seat portion 18 of the cap 3, so that the drain hole 15 can be blocked. The contact portion 25 of the valve member 21 directly contacts with the valve seat portion 18 of the cap 3, or the contact portion 25 indirectly contacts with the valve seat portion 18 via the seal member provided to the valve member 21 or the valve seat portion 18, for example. Thus, the contact portion can block the drain hole 15.

A structure, an installation manner, a material or the like of the resilient means 11 can be freely determined, as long as the resilient means 11 urges the valve member 21 in a direction, in which the valve member 21 blocks the drain hole 15. A coil spring, a disc spring and a blade spring can be used as the resilient means 15, for example. The resilient means 15 can be provided between an element support (e.g., plate) 12 supporting the filter element 5 and the valve member 21, for example. The resilient means 15 can urge the filter element 5 with the element support 12 to support both the filter element 5 and the element support 12, for example.

A structure, a shape, a material or the like of the drain tool 30 can be freely determined, as long as the drain tool 30 includes the drain passage 35 and the hooking portion 32.

The communication passage 35*b* of the drain passage 35 communicates with the central passage 35*a*, and opens to the outer circumferential periphery of the drain tool 30. Central holes opening to both axial ends of the drain tool 30 and a central hole opening to one axial end of the drain tool 30 can be used as the central passage 35*a*, for example. As the communication passage 35*b*, a space 35 formed in the axial end of the drain tool 30 as described above, a slit notched on the axial end of the drain tool 30, and a through hole penetrating the outer circumferential periphery of the drain tool 30 can be used, for example.

A structure, a shape, a material or the like of the hooking portion 32 of the drain tool 30 can be freely determined, as long as the hooking portion 32 is attachable and detachable from the hooked portion 18 of the cap 3. The hooking portion 32 is provided to an axial end of the drain tool 30, or provided to a predetermined axially intermediate position of the drain tool 30, for example. The hooking portion 32 can be integrally formed with the drain tool 30 or can be formed as a member separated from the drain tool 30, for example. The hooking portion 32 can be radially internally protruded from one end of the drain tool 30, for example. In this case, the space 35*b* can be also formed with the protruded hooking portion 32 to be the communication passage 35*b*.

A structure, a shape, a material or the like of the flange portion 33 can be freely determined, as long as the flange portion 33 contacts with the seal member 17 provided to the bottom portion of the cap 3. The flange portion 33 can include a flat face that presses the seal member 17 in the axial direction of the drain tool 30, for example, in addition to the annular rib 33*a* that presses the seal member 17 in the radial direction of the drain tool 30.

A structure, a shape, a material or the like of the connecting portion 37 of the drain tool 30 can be freely determined, as long as the connecting portion 37 can connect to the hose 110 for draining remaining oil.

As shown in FIG. 6, the drain tool 30 can be integrally formed with the detaching tool 300 that is used for detaching the cap 3 from the case 2 and/or attaching the cap 3 to the case 2, for example. The detaching tool 300 can be a cylindrical tool that has a hooking portion 300*a*, which is attachable and detachable from a hooked portion 3*b* formed on the outer circumferential periphery of the cap 3, for example. The drain tool 30 can be integrally formed with the detaching tool 300, or formed as a member separated from the detaching tool 300, for example.

Various modifications and alternations may be diversely made to the above embodiments without departing from the spirit of the present invention.

What is claimed is:

1. A drain structure for a fluid filter, the drain structure comprising:
   a cap that defines a drain hole;
   a drain member that is attachable to the drain hole of the cap from an outside of the cap such that the drain member blocks the drain hole when the drain member is attached to the drain hole;
   a valve member that is provided inside the cap; and a resilient means that biases the valve member in a direction in which the valve member blocks the drain hole, wherein the cap is attachable to a drain tool when the drain member is detached from the cap, the drain tool has a hooking portion that is detachably hooked to a hooked portion provided to the cap, when the drain tool is inserted into the drain hole of the cap and the hooking portion displaces the valve member in a direction in which the drain hole is unblocked, the drain tool is rotated around an axis of the drain hole so that the hooking portion and the hooked portion are attached to and detached from each other, when the drain tool is inserted into the drain hole and the drain hole is unblocked, the drain tool is inserted into the drain hole so that the drain tool displaces the valve member against resilience of the resilient means to unblock the drain hole blocked by the valve member, the hooking portion of the drain tool is formed on one axial end of the drain tool, the one axial end being located on the side of the valve member, the hooking portion protrudes in an axial direction of the drain tool, the hooking portion outwardly protrudes in a radial direction of the drain tool, and when the hooking portion and the hooked portion are attached to each other, the hooking portion is interposed between the valve member and the hooked portion.

2. A drain tool unit for a fluid filter, the fluid filter including a housing constructed with a case and a cap, the cap defining a drain hole that is connectable with a drain member such that the drain member blocks the drain hole of the cap when the cap is connected with the drain member, the housing receiving the valve member biased by a resilient means in a direction in which the valve member blocks the drain hole, the drain tool unit comprising:

a drain tool that is connectable to the drain hole of the cap when the drain member is removed from the cap, the drain tool including a hooking portion that detachably hooks to a hooked portion provided to the cap when the drain tool is inserted into the drain hole of the cap to displace the valve member in a direction in which the drain hole is unblocked, wherein the drain tool is rotated around an axis of the drain hole so that the hooking portion and the hooked portion are connected with and disconnect from each other, when the drain tool is inserted into the drain hole and the drain hole is unblocked, the drain tool defines a drain passage that includes a central passage along an axial direction of the drain tool, the drain passage includes a communication passage communicating with the central passage, the communication passage opens to a radially outer circumferential periphery of the drain tool, the drain tool is integrally formed with a detaching tool, the detaching tool is connectable with the cap to detach the cap from the case, and the detaching tool is connectable with the cap to attach the cap to the case.

3. A drain structure according to claim 1, wherein the hooked portion of the cap has a guide groove that is formed along the axis of the drain hole so that the guide groove guides the hooking portion in an axial direction of the drain hole, and the hooked portion of the cap has a restriction face that is substantially perpendicular to the axial direction of the drain hole so that the restriction face restricts movement of the hooking portion in the axial direction of the drain hole.

4. A drain structure according to claim 1, wherein the cap has a seal member that is located between the cap and the drain member when the drain member is attached to the drain hole.

5. A drain structure according to claim 1, wherein the drain tool is inserted into the drain hole of the cap so that the cap and the drain tool form a seal structure therebetween.

6. A fluid filter comprising:

a housing that includes a case and a drain structure, the drain structure including, a cap that is connected to the case, the cap defining a drain hole, a drain member that is attachable to the drain hole of the cap from an outside of the cap such that the drain member blocks the drain hole when the drain member is attached to the drain hole, a valve member that is received in the housing, and a resilient means that biases the valve member in a direction in which the valve member blocks the drain hole, wherein the cap is attachable to the a drain tool when the drain member is detached from the cap, the drain tool has a hooking portion that is detachably hooked to a hooked portion provided to the cap, when the drain tool is inserted into the drain hole of the cap so that the hooking portion displaces the valve member in a direction in which the drain hole is unblocked, the drain tool is rotated around an axis of the drain hole so that the hooking portion and the hooked portion are attached to and detached from each other, when the drain tool is inserted into the drain hole and the drain hole is unblocked, the drain tool is inserted into the drain hole so that the drain tool displaces the valve member against resilience of the resilient means to unblock the drain hole blocked by the valve member, the hooking portion of the drain tool is formed on one axial end of the drain tool, the one axial end being located on the side of the valve member, the hooking portion protrudes in an axial direction of the drain tool, the hooking portion outwardly protrudes in a radial direction of the drain tool, and when the hooking portion and the hooked portion are attached to each other, the hooking portion is interposed between the valve member and the hooked portion.

7. A drain tool unit for a fluid filter, the fluid filter including a housing constructed with a case and a cap, the cap defining a drain hole that is connectable with a drain member such that the drain member blocks the drain hole of the cap when the cap is connected with the drain member, the housing receiving the valve member biased by a resilient means in a direction in which the valve member blocks the drain hole, the drain tool unit comprising:

a drain tool that is connectable to the drain hole of the cap when the drain member is removed from the cap, the drain tool including a hooking portion that detachably hooks to a hooked portion provided to the cap when the drain tool is inserted into the drain hole of the cap and the hooking portion displaces the valve member in a direction in which the drain hole is unblocked, wherein the drain tool is rotated around an axis of the drain hole so that the hooking portion and the hooked portion are connected with and disconnect from each other, when the drain tool is inserted into the drain hole and the drain hole is unblocked, the drain tool defines a drain passage that includes a central passage along an axial direction of the drain tool, the drain passage includes a communication passage communicating with the central passage, and the communication passage opens to a radially outer circumferential periphery of the drain tool, the drain tool is inserted into the drain hole so that the drain tool displaces the valve member against resilience of the resilient means to unblock the drain hole blocked by the valve member, the hooking portion of the drain tool is formed on one axial side of the drain tool, the one axial end being located on the side of the valve member, the hooking portion protrudes in an axial direction of the drain tool, the hooking portion outwardly protrudes in a radial direction of the drain tool, and when the hooking portion and the hooked portion are attached to each other, the hooking portion is interposed between the valve member and the hooked portion.

8. A drain tool unit according to claim 7, wherein the drain tool includes a flange portion that contacts with a seal member provided to the cap when the drain tool is connected to the cap, so that the seal member is located between the flange portion of the drain tool and the cap.

9. A drain tool unit according to claim 7, wherein the drain tool includes a connecting portion that is connectable with a hose for draining fluid.

10. A drain tool unit according to claim 7, wherein the drain tool is integrally formed with a detaching tool, the detaching tool is connectable with the cap to detach the cap from the case, and the detaching tool is connectable with the cap to attach the cap to the case.

11. A method for draining a fluid filter including a housing constructed with a case and a cap, the cap defining a drain hole, the method comprising the steps of;

detaching a drain member from the drain hole of the cap, the drain member detachably attached to the drain hole from an outside of the cap to block the drain hole;

inserting a drain tool into the drain hole such that a hooking portion, which axially and radially protrudes from one axial end of a drain tool on the side of the valve member, displaces a valve member in the housing against resiliency of the resilient means that biases the valve member in a direction in which the valve member blocks the drain hole, so that the drain tool unblocks the drain hole; and rotating the drain tool around an axis of the drain hole to hook the hooking portion of the drain tool to a hooked portion provided to the cap, such that the hooking portion is interposed between the valve member and the hooked portion, thereby maintaining the drain hole unblocked and fluid in the housing is drained to an outside through the drain passage defined in the drain tool.

12. The method according to claim 11, wherein when the hooking portion is interposed between the valve member and the hooked portion, the hooking portion directly makes contact with the valve member, so that the hooking portion is biased to the hooked portion by the valve member.

13. The drain structure according to claim 1, wherein when the hooking portion and the hooked portion are attached to each other, the hooking portion directly makes contact with the valve member, so that the hooking portion is biased to the hooked portion by the valve member.

14. The fluid filter according to claim 6, wherein when the hooking portion and the hooked portion are attached to each other, the hooking portion directly makes contact with the valve member, so that the hooking portion is biased to the hooked portion by the valve member.

15. The drain tool unit according to claim 7, wherein when the hooking portion and the hooked portion are attached to each other, the hooking portion directly makes contact with the valve member, so that the hooking portion is biased to the hooked portion by the valve member.

* * * * *